Oct. 18, 1966    D. W. ROLLINS    3,279,731
COLLAPSIBLE HITCH

Filed Dec. 28, 1964    5 Sheets-Sheet 1

INVENTOR.
DALLAS W. ROLLINS
BY Eugen N. Riddle

ATTORNEY

Oct. 18, 1966    D. W. ROLLINS    3,279,731
COLLAPSIBLE HITCH
Filed Dec. 28, 1964    5 Sheets-Sheet 2
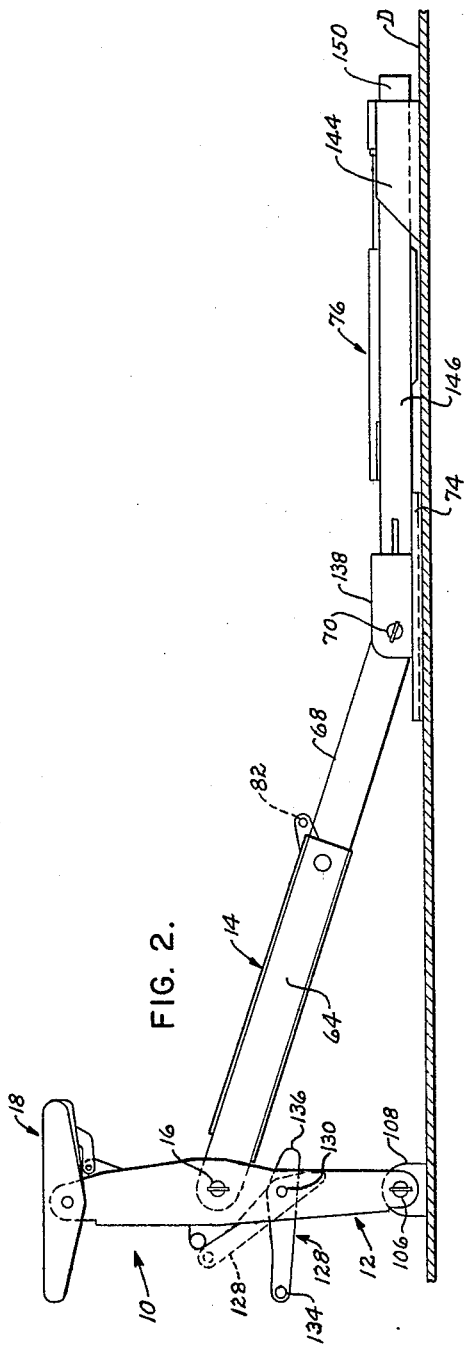
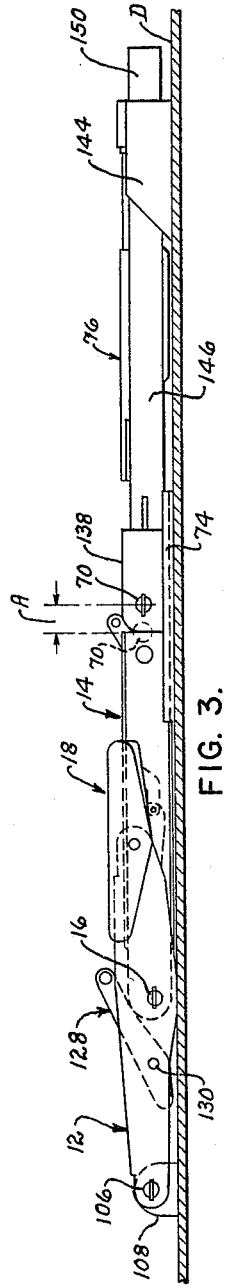
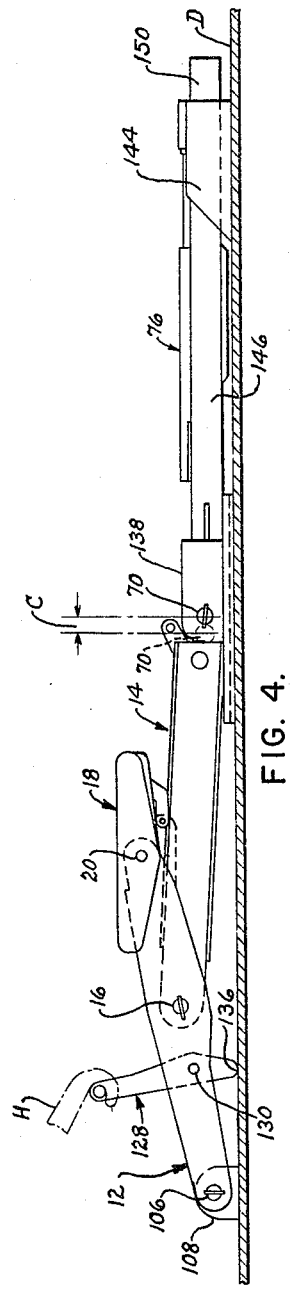
INVENTOR.
DALLAS W. ROLLINS
BY Eugene N. Riddle
ATTORNEY INVENTOR.
DALLAS W. ROLLINS
BY Eugene N. Riddle
ATTORNEY Oct. 18, 1966   D. W. ROLLINS   3,279,731
COLLAPSIBLE HITCH Filed Dec. 28, 1964   5 Sheets-Sheet 4

INVENTOR.
DALLAS W. ROLLINS
BY Eugene M. Riddle

ATTORNEY

Oct. 18, 1966   D. W. ROLLINS   3,279,731
COLLAPSIBLE HITCH

Filed Dec. 28, 1964   5 Sheets-Sheet 5

INVENTOR.
DALLAS W. ROLLINS
BY Eugene M. Riddle

ATTORNEY

United States Patent Office 3,279,731
Patented Oct. 18, 1966

3,279,731
COLLAPSIBLE HITCH
Dallas W. Rollins, St. Charles, Mo., assignor to ACF
Industries, Incorporated, New York, N.Y., a corporation of New Jersey
Filed Dec. 28, 1964, Ser. No. 421,241
5 Claims. (Cl. 248—119)

This invention relates to a collapsible hitch for highway trailers and the like and more particularly to a collapsible type hitch adapted to be pulled up to an erect position and knocked down to a collapsed position by a tractor or the like. An example of such a collapsible hitch is shown in copending application S. N. 324,461 filed November 18, 1963, now Patent No. 3,225,707, and entitled "Collapsible Support," the entire disclosure of which is incorporated by this reference.

Collapsible type hitches which are knocked down and pulled up by a tractor are generally heavy and in some instances are difficult and cumbersome to pull up especially when the angle is very small at which leverage is applied from a hook on the tractor. It is also desirable that the fall of the hitch be cushioned when the hitch is knocked down and collapsed against the deck of the car to protect the hitch from damage or wear and tear.

The present invention provides an assist in pulling the hitch from collapsed position to permit the hitch to be raised with a minimum of pulling force. The assist may comprise a cam-type lever actuated by the hook on the tractor to cam the hitch upwardly when the hitch is initially raised from collapsed position. Additionally, when a cushioned hitch is employed, the existing cushioning unit may be used to assist in the raising of the hitch from collapsed position and to cushion the fall of the hitch to collapsed position. The weight and momentum of the hitch when it falls to collapsed position precompresses the cushioning unit adacent the end of the fall thereby to cushion the hitch. As the cushioning unit is precompressed when it is initially raised from collapsed position, the cushioning unit issists or aids in the raising of the hitch as the hitch is raised past a dead center position with respect to the pivots adjacent the lower ends of the diagonal support and vertical support. When employed in combination with the cushioning unit, the cam-type lever may be utilized to raise the hitch past the dead center position so that the cushioning unit is then effective to raise the hitch. If desired, the cam-type lever may be employed separately.

It is an object of the present invention to provide a collapsible hitch in which cam means are utilized to assist in the initial raising of the hitch from collapsed position.

Another object of this invention is to provide a collapsible cushioned hitch adapted to be raised and knocked down by a tractor or the like.

An additional object of this invention is the provision of a collapsible cushioned hitch in which the existing cushioning unit is utilized to break the fall of the hitch upon collapsing and to assist in the raising of the hitch from collapsed position.

The invention accordingly comprises the constructions hereinafter described, the scope of the invention being indicated in the following claims.

In the accompanying drawings, in which two possible embodiments of the invention are illustrated, FIGURE 1 is a fragmentary side elevational view of a trailer secured to a railway flat car by the trailer hitch comprising one embodiment of the present invention, a tractor being illustrated for raising and collapsing the hitch;

FIGURE 2 is an enlarged side elevational view of the trailer and hitch shown in FIGURE 1 illustrating the hitch in a raised position;

FIGURE 3 is a side elevational view of the hitch of FIGURE 2 illustrating the hitch in a collapsed position;

FIGURE 4 is a side elevational view similar to FIGURE 3 but illustrating an initial position of the hitch after the hitch has been assisted in being raised to a partly raised position;

Corresponding reference characters indicate corresponding parts throughout the several views of the drawings.

Figure 1:
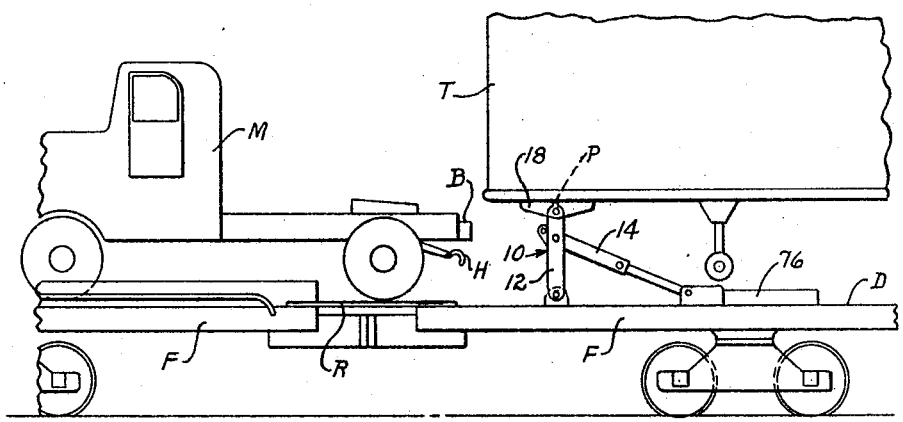

Referring to the drawings, and particularly to FIGURE 1, railway flat cars F are coupled to each other and their floor or deck plates D are spanned by bridge plates R. A tractor M is supported on bridge plates R when moving from one flat car to another. A trailer T is partially shown in FIGURE 1 and a collapsible trailer hitch or support indicated generally at 10 is mounted on a flat car F. Trailer T has a kingpin P extending from its front end (see also FIGURE 5) which is engaged and locked in position to hold the associated trailer in secured position. Flat car F is of a low level type in which the deck height is minimized. While hitch 10 is illustrated in the drawings as mounted on a railway flat car, it is to be understood that the hitch may be mounted on other transporting means, such as, for example, barges, or the like.

Referring particularly to FIGURES 2, 5, 6 and 7, hitch 10 comprises a vertical support generally designated 12 and a diagonal support generally designated 14 pivotally connected about a horizontal pivot 16 to vertical support 12. A fifth wheel or supporting plate is generally designated 18 and is pivotally connected at 20 about a horizontal pivot to the extending end of vertical support 12. Hitch 10 is adapted to be pulled from a collapsed position to an erect position by a hook H on the rear of tractor M upon forward movement of the tractor. A bumper block B on the rear of tractor M is adapted to knock hitch 10 to a collapsed position from erect position upon rearward movement of the tractor and thereby effect unlocking of trailer kingpin P and unlocking of diagonal support 14 permitting collapsing of hitch 10 as will be explained more fully.

Figure 7:
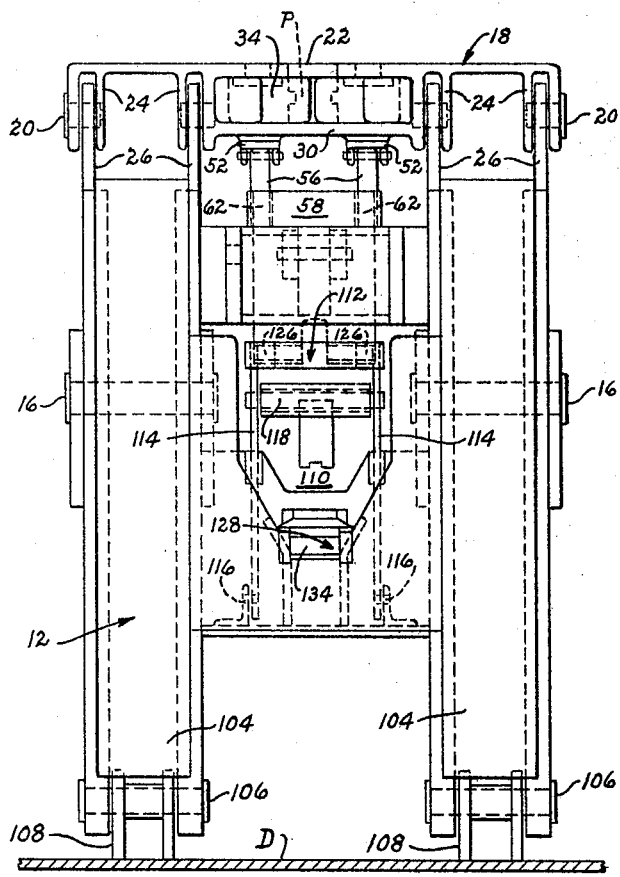
FIGURE 7 is a front elevational view of the hitch of FIGURES 1–6 illustrating the hitch in a raised position.

Fifth wheel plate 18 comprises an upper plate 22 having ribs 24 which receive fingers 26 extending from vertical support 12. Fingers 26 are pivotally connected to ribs 24 about pivots 20 to mount fifth wheel plate 18 for pivotal movement relative to vertical support 12. Extending between a pair of inner ribs 24 is a lower plate 30 forming a pocket with upper plate 22 as shown in FIGURE 7. Mounted on lower plate 30 for rotation on pins 32 are facing, complementary locking jaws 34 adapted to engage and secure kingpin P on trailer T.

Each jaw 34 has a notch 36 adapted to be engaged in locked position by an arm 40 of a yoke or bail 38. A torsion spring 42 continuously urges each jaw to unlocked position and prevents inadvertent swinging of the jaws to a closed position before kingpin P contacts and swings the jaws to closed position. A spring 46 is compressed between yoke 38 and a bracket or stop 48 secured to lower plate 30 to bias yoke 38 in a rearward direction. Spring 46 telescopes a rod 50 secured to bracket 48.

Figure 6:
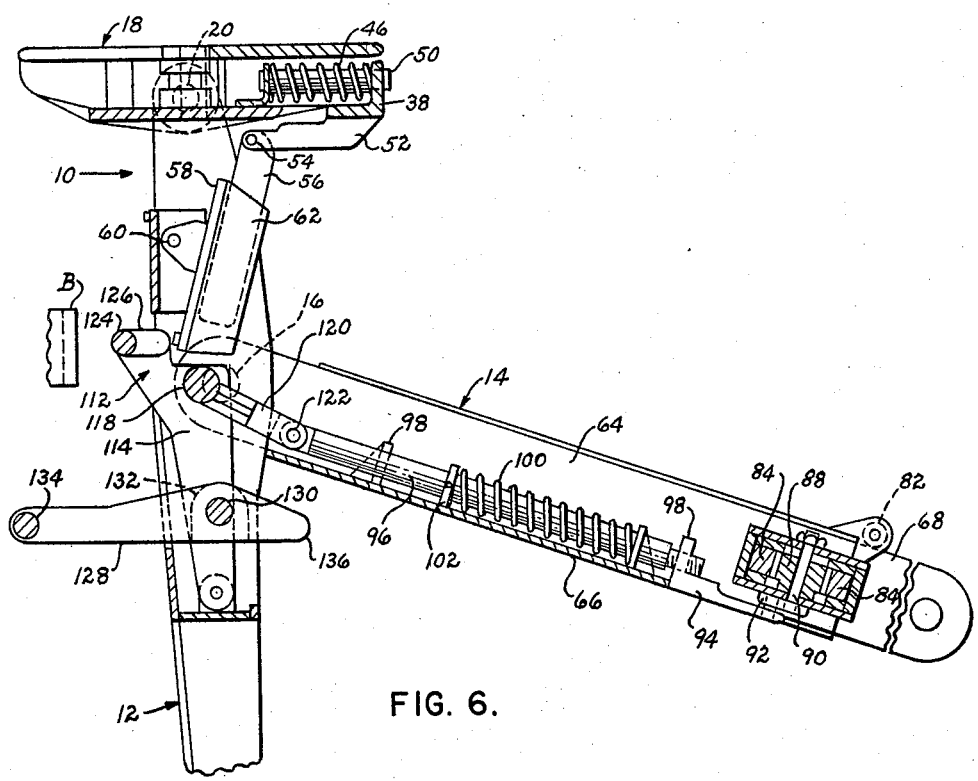
FIGURE 6 is a partial side elevational view of the hitch with certain parts broken away and illustrating the locked position of the kingpin and the locked position of the diagonal support.

To actuate yoke 38, two arms 52 are secured to its underside as shown in FIGURES 6 and 7. Pivotally mounted at 54 to each arm 52 is a link 56. A pivot plate 58 is pivotally mounted at 60 to vertical support 12. An open ended box-shaped extension 62 on each side of pivot plate 58 receives an associated link 56 in telescoping relation as shown in FIGURE 6 to permit free slippage between links 56 and extensions 62.

Figure 8:
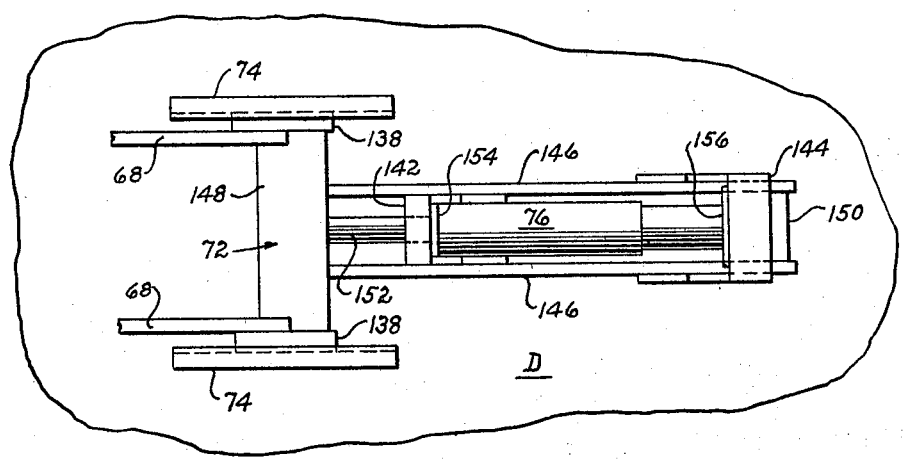
FIGURE 8 is a fragmentary plan view of a cushioning unit for the hitch shown in FIGURES 1–7.

Diagonal support 14 comprises a pair of upper box-shaped diagonal legs 64 connected by a bottom plate 66. Telescoped within each box-shaped leg 64 is a separate lower leg 68 of a generally rectangular cross-sectional area. Each leg 68 is pivotally mounted at 70 to a shoe 72 mounted for cushioned back and forth sliding movement along floor plate D between guide rails 74 secured to deck D as shown in FIGURES 2 and 8. Shoe 72 is operatively connected to a cushioning unit generally designated 76 as shown in FIGURES 1 and 2 and slides back and forth upon impact and draft forces being exerted against the railway car F.

To hold legs 64 and 68 in proper aligned position when the hitch is erected, openings which register in the erect position of hitch 10 are formed in legs 64 and 68. Locking pins 80 are inserted through the aligned openings in legs 64, 68 to lock diagonal support 14 in the erect position of the hitch. To decrease frictional contact between legs 64, 68 when the hitch is moved between collapsed and erect positions, a roller 82 is carried by each leg 64 for riding along the adjacent top surface of the associated telescoping leg 68.

Figure 5:
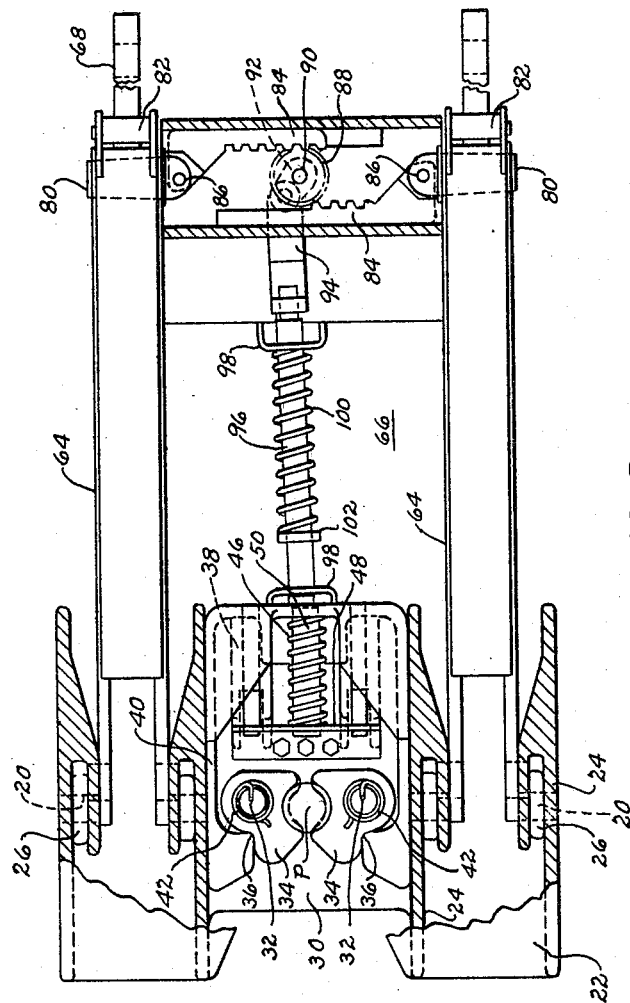
FIGURE 5 is a top plan of the hitch of FIGURES 1–4 in raised position with certain portions being broken away to illustrate the locked position of the kingpin and the locked position of the diagonal support when the hitch is in raised position.

Referring to FIGURES 5 and 6, means to insert pins 80 in the registering openings of legs 64, 68 include racks 84 pivotally connected at 86 to pins 80. A pinion 88 on shaft 90 engages racks 84 and a suitable housing encloses pinion 88 and racks 84. A lever or arm 92 is fixed to the lower end of shaft 90 and a link 94 is pivotally connected to arm 92. Rod 96 is mounted for longitudinal movement within suitable openings of projections 98 secured to bottom plate 66. A spring 100 is compressed between a stop 102 secured to rod 96 and rear projection 98 to bias rod 96 and pinion 88 in a direction to urge pins 80 outwardly in locked position with legs 64 and 68.

Referring specifically to FIGURE 7, vertical support 12 has spaced lower legs 104 pivotally connected at 106 to lugs 108 secured to floor D. The front face of vertical support 12 has an open pocket 110 in which a push lever or actuating member indicated generally at 112 is mounted. Actuating member 112 has legs 114 pivoted at 116 to vertical support 12 as shown in FIGURES 6 and 7. A horizontal cross member 118 extends between legs 114 and has a link 120 pivoted at 122 to rod 96. A horizontal push bar 124 also connects legs 114 and is positioned forwardly of vertical support 12. Lever 112 is urged outwardly by the bias of spring 100 and rod 96. The lower end of pivot plate 58 is biased by spring 46 against push lever 112 and bears against lugs 126 on push lever 112.

To knock hitch 10 from erect position to collapsed position, bumper block B on the rear of tractor M engages push lever 112 upon rearward movement of the tractor to move rod 96 and rotate pinion 88 for pulling pins 80 from the registering openings of telescoping legs 64, 68. Substantially simultaneously therewith, pivot plate 58 is pivoted by the rearward movement of push lever 112 to move yoke 38 in a forward direction thereby to permit jaws 34 to swing open upon a rearward movement of fifth wheel plate 18 away from kingpin P.

Figure 4A:
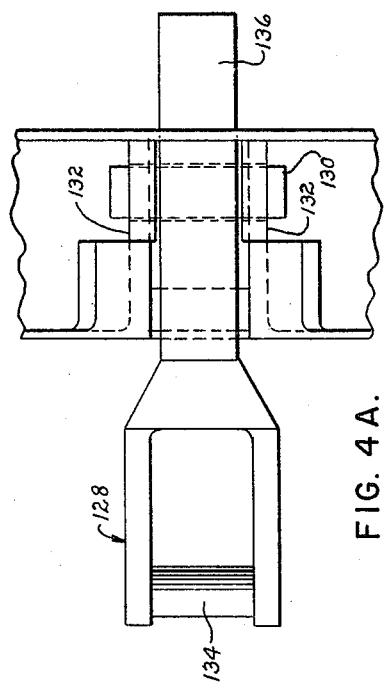
FIGURE 4A is a fragmentary plan view of the cam means to assist in raising the hitch and showing the cam means connected to the vertical leg.

Referring to FIGURES 3, 4 and 4A particularly and forming an important feature of this invention, means are illustrated to pull the hitch from collapsed position. Hitches are oftentimes cumbersome and heavy and it is desirable to have an assist at least in the initial raising of the hitch from collapsed position. To assist in the pull-up of the hitch, a pull-up lever 128 is positioned within pocket 110 and pivotally mounted about pin 130 supported by lugs 132 on vertical support 12. Lever 128 has a bar 134 adjacent one end adapted to be engaged by a hook H on tractor M for raising the hitch. The other opposite end of lever 128 has a cam 136 which in the collapsed position of hitch 10 is adapted to bear against floor plate D on the railway car. When hook H engages bar 134 in the collapsed position of the hitch as shown in FIGURE 3, lever 128 is pivoted to cam hitch 10 to the position shown in FIGURE 4 at an angle of around 10 degrees with respect to the horizontal. From this position, the momentum of tractor M easily pulls the hitch 10 to erect position. As shown in FIGURE 2, lever 128 projects from the front of vertical support 12 in a generally horizontal direction spaced below bumper block B. If desired, lever 128 could be urged into engagement with push lever 112 by a suitable means, such as a torsion spring (not shown). In this event, bumper block B would engage lever 128 as shown in broken lines in FIGURE 2 which in turn would actuate push lever 112 to collapse the hitch.

To provide a further assist which may be employed separately or in combination with pull-up lever 128, cushioning unit 76 may be precompressed upon collapsing of hitch 10 as shown in FIGURE 3. Referring to FIGURE 8, slide or sliding shoes 72 has slide blocks 138 mounted for sliding movement along rabbeted guide rails 74 secured to floor plate D. Cushioning unit 76 is positioned between fixed end abutments 142, 144 secured to floor plate D to provide positive stops for cushioning unit 76. Sliding shoe has sides 146 connected by cross members 148, 150. A rod 152 secured to cross member 148 engages end cap 154 of cushioning unit 76 to form a movable abutment while cross member 150 engages the end cap 156 of cushioning unit 76 to form a movable abutment. Upon the exertion of impact forces and movement of sliding shoe 72 in a rearward direction viewing FIGURE 8, end cap 156 is restrained by stop 144 and end cap 154 is moved away from stop 142 by rod 152 bearing against cap 154. Upon the exertion of impact forces and movement of sliding shoe 72 in a forward direction viewing FIGURE 8, end cap 154 is restrained by stop 142 and end cap 156 is moved away from stop 144 by cross member 150.

Upon collapsing of hitch 10 and unlocking of pins 80, legs 64, 68 telescope. Before hitch 10 fully collapses on floor D and when vertical leg 12 reaches an angle of around fifteen (15) degrees with respect to the horizontal, the rearward ends of legs 64 abut sliding shoe 72 to urge sliding shoe 72 in a rearward direction similar to the movement of sliding shoe 72 under impact forces. The weight and momentum of hitch 10 is sufficient to move shoe 72 a distance of between around two and three inches thereby to compress cushioning unit 76 when hitch 10 reaches fully collapsed position on floor D.

When hitch 10 is in collapsed position as shown in FIGURE 3, pivot 16 connecting diagonal support 14 and vertical support 12 is past a dead center position with respect to pivots 70, 106. Thus, the precompressed cushioning unit 76 acting along diagonal support 14 urges vertical support 12 and fifth wheel plate 18 to collapsed position and releasably locks the hitch in collapsed position. When hitch 10 is pulled upwardly from collapsed position pivot 16 swings past a dead center relation with respect to pivots 70, 106 and the precompressed cushioning unit 76 then urges vertical support 12 and fifth wheel plate 18 toward raised position thereby aiding in the raising of the hitch. If sliding shoe 72 precompresses cushioning unit 76 around two inches, unit 76 will aid in assisting the raising of hitch 10 until vertical support 12 reaches a position at an angle of around fifteen (15) degrees with respect to the horizontal plane. If a substantial precompression of cushioning unit 76 is obtained, such as over 2 inches of travel, a relatively large lifting force may be required to move hitch 10 past its dead center position so that the cushioning unit will assist in lifting. If pull-up lever 128 is employed in combination with cushioning unit 76, the hitch will be easily moved past dead center position from collapsed position when lever 128 is actuated.

Referring to FIGURE 3, pivot 70 and cushioning unit 76 move a distance A of around three inches upon collapsing of hitch 10 thereby to preload unit 76. As shown in FIGURE 4, after pull-up lever 128 has cammed hitch 10 upwardly, unit 76 and pivot 70 remain a distance C of around 2 inches from their original position thereby to urge hitch 10 upwardly until pivot 70 is returned to its original position reached when vertical support 12 is around fifteen (15) degrees with respect to the horizontal.

It is to be understood that cushioning units other than a fluid cylinder may be employed satisfactorily, such as for example, a plurality of resilient buffer discs separated by metal plates.

Operation is as follows:

Upon rearward movement of tractor M, push lever 112 is pushed inwardly to unlock diagonal legs 64, 68 upon rotation of pinion 88 and withdrawal of pins 80 from the aligned openings in legs 64, 68. Inward movement of push lever 112 moves bail 38 in a forward direction to permit jaws 34 to swing open upon rearward movement of the tractor. Bumper block B on tractor M pushes vertical support 12 to collapsed position upon further rearward movement of tractor M after actuation of push lever 112. When vertical support 12 reaches an angle of about 15 degrees with respect to the horizontal, telescoping legs 64 engage sliding shoe 72 to recompress cushioning unit 76 thereby to aid in breaking the fall of hitch 10 for cushioning.

For raising hitch 10 from collapsed position, hook H engages bar 134 and tractor M is moved forwardly to pivot lever 128 to the position shown in FIGURE 4 thereby aiding in the raising of hitch 10. Also, when pivot 16 moves past dead center position with respect to pivots 70, 106 cushioning unit 76 aids in the raising of hitch 10 thus permitting a relatively small pulling force to erect the hitch. Suitable aligning means porperly align the openings in legs 64, 68 when the hitch is erected and locking pins 80 moves into the aligned openings under the bias of spring 100 and pinion 88. This permits push lever 112 to pivot outwardly forwardly of vertical support 12. Once the hitch is erected and hook H has been removed from bar 134, the trailer may be lowered from the fifth wheel of tractor M to supporting position on the fifth wheel plate 18 with kingpin P slightly forward of jaws 34 which remain in open position. Then, a rearward push against trailer T by the tractor fifth wheel adjacent the lower front edge of trailer T moves trailer T rearwardly and slides kingpin P into contact with jaws 34. Jaws 34 swing around kingpin P and yoke 38 locks the jaws in position.

Figure 9:
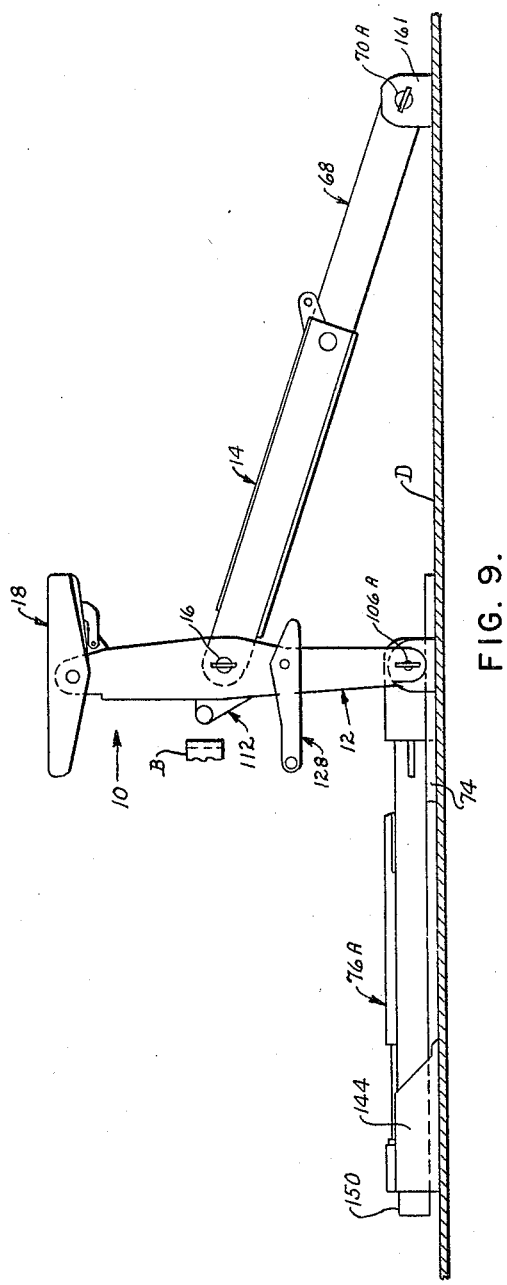
FIGURE 9 is a side elevation of another embodiment of the hitch comprising the present invention illustrating a cushioning means adjacent the lower end of the vertical support with the lower end of the diagonal support being fixed.

Referring to the embodiment of FIGURE 9, cushioning unit 76A is illustrated as pivotally connected at 106A to vertical support 12. Diagonal support 14 has its lower end pivotally connected at 70A to a lug 161 fixed to floor D. Cushioning unit 76A functions in a manner similar to cushioning unit 76 in the embodiment of FIGURES 1–8 and cushions the fall of hitch 10 in addition to aiding in the erection of the hitch.

In view of the above, it will be seen that the several objects of the invention are achieved and other advantageous results obtained.

As various changes could be made in the above constructions without departing from the scope of this invention, it is intended that all matter contained in the above description or shown in the accompanying drawings shall be interpreted as illustrative and not in a limiting sense.

I claim:

1. A collapsible hitch adapted to releasably secure the kingpin of a trailer or the like on a railway car, comprising, a supporting base, a vertical support pivotally connected adjacent its lower end about a generally horizontal pivot adjacent said base for movement between a generally vertically extending erect position and a generally horizontal collapsed position, a diagonal support pivotally connected adjacent one end to the vertical support about a generally horizontal pivot at a position intermediate the length of the vertical support and pivotally connected adjacent its other lower end about a generally horizontal pivot adjacent the base, a fifth wheel plate on the upper end of said vertical support, latch means for the fifth wheel plate to secure the kingpin of a trailer, said diagonal support movable between an extended position when the hitch is raised and a retracted position when the hitch is collapsed, means for releasably locking the diagonal support in extended position, an actuating member operatively connected to the locking means for unlocking the diagonal support when engaged by a tractor or the like, a cushioning unit for cushioning the hitch in its erect position operatively connected to one of said horizontal pivots with said one pivot being movable in a cushioned action relative to the supporting base when the railway car is subjected to impact forces, said cushioning unit upon collapsing of the hitch being preloaded adjacent the end of the fall of the hitch and retaining said preloading after being collapsed, and cam means on said vertical support, said cam means comprising a lever pivoted on the vertical support and having a generally horizontal bar on the upper side of the lever adapted to be engaged by a hook or the like from a tractor for lifting the hitch from collapsed position to an erect position, said lever having a cam on the lower side thereof engaging the supporting base to cam the hitch toward an erect position upon pivoting of the lever from a pulling force exerted on the horizontal bar from the hook to assist in the initial movement of the hitch from collapsed position, said cushing unit continuously urging said movable pivot when preloaded and aiding in the movement of the hitch from collapsed position until its preloading is removed thereby assisting in combination with said cam means in the initial raising of the hitch.

2. A collapsible hitch as set forth in claim 1 wherein said cushioning unit is operatively connected to the lower end of said vertical support.

3. A collapsible hitch as set forth in claim 1 wherein said cushioning unit is operatively connected to the lower end of said diagonal support.

4. A collapsible hitch adapted to releasably secure the kingpin of a trailer or the like on a railway car comprising, a supporting base, a vertical support pivotally connected adjacent its lower end about a generally horizontal pivot adjacent said base for movement between a generally vertically extending erect position and a generally horizontal collapsed position, a diagonal support pivotally connected adjacent one end to the vertical support at a position intermediate the length of the vertical support and pivotally connected adjacent its other lower end about a generally horizontal pivot adjacent the base, a fifth wheel plate on the upper end of said vertical support, latch means carried by the fifth wheel plate to secure the kingpin, said diagonal support movable between an extended position in the raised position of the hitch and a retracted position in the collapsed position of the hitch, means for releasably locking the diagonal support in extended position, an actuating member operatively connected to the locking means for unlocking the diagonal support, and cam means on said vertical support, said cam means comprising a lever pivoted on the vertical support and having hook catch means on the upper side of the lever adapted to be engaged by a hook or the like from a tractor for lifting the hitch from collapsed position to an erect position, said lever having a cam on the lower side thereof engaging the supporting base to cam the hitch toward an erect position upon pivoting of the lever from a pulling force exerted on the hook catch means from the hook.

5. A collapsible hitch adapted to releasably secure the kingpin of a trailer or the like on a railway car comprising, a supporting base, a vertical support pivotally connected adjacent its lower end about a generally horizontal pivot adjacent said base for movement between a generally vertically extending erect position and a generally horizontal collapsed position, a diagonal support pivotally connected adjacent one end to the vertical support about a generally horizontal pivot at a position intermediate the length of the vertical support and pivotally connected adjacent its other lower end about a generally horizontal pivot adjacent the base, a fifth wheel plate on the upper end of said vertical support, latch means for the fifth wheel plate to secure the kingpin, said diagonal support movable between an extended position in the raised position of the hitch and a retracted position in the collapsed position of the hitch, means for releasably locking the diagonal support in extended position, an actuating member operatively connected to the locking means for unlocking the diagonal support, a cushioning unit for cushioning the hitch in its erect position operatively connected to the lower end of one of said supports with said lower end being movable in a generally horizontal cushioned movement relative to the supporting base when the railway car is subjected to impact forces, said cushioning unit upon collapsing of the hitch being preloaded adjacent the end of the fall of the hitch by force exerted against said movable lower end thereby to cushion the fall of the hitch, and a cam lever pivotally connected to said vertical support and having hook catch means adapted to be engaged by a hook or the like for lifting the hitch from a collapsed position to an erect position, said lever having a lower cam portion bearing against said supporting base in the collapsed position of the hitch and camming the hitch toward a raised position upon pivoting of the lever from a pulling force exerted by the hook, said cushioning unit continuously urging said movable lower end when preloaded and assisting said lever in the initial raising of the hitch from collapsed position until the preloading is removed.

References Cited by the Examiner
UNITED STATES PATENTS

| | | | |
|---|---|---|---|
| 2,886,286 | 5/1959 | Walls | 254—127 |
| 3,164,346 | 1/1965 | Bateson | 248—119 |
| 3,183,854 | 5/1965 | Candlin et al. | 248—119 X |
| 3,190,595 | 6/1965 | Ferris | 248—119 |

CLAUDE A. LE ROY, *Primary Examiner.*

R. P. SEITTER, *Assistant Examiner.*